Figure 1:
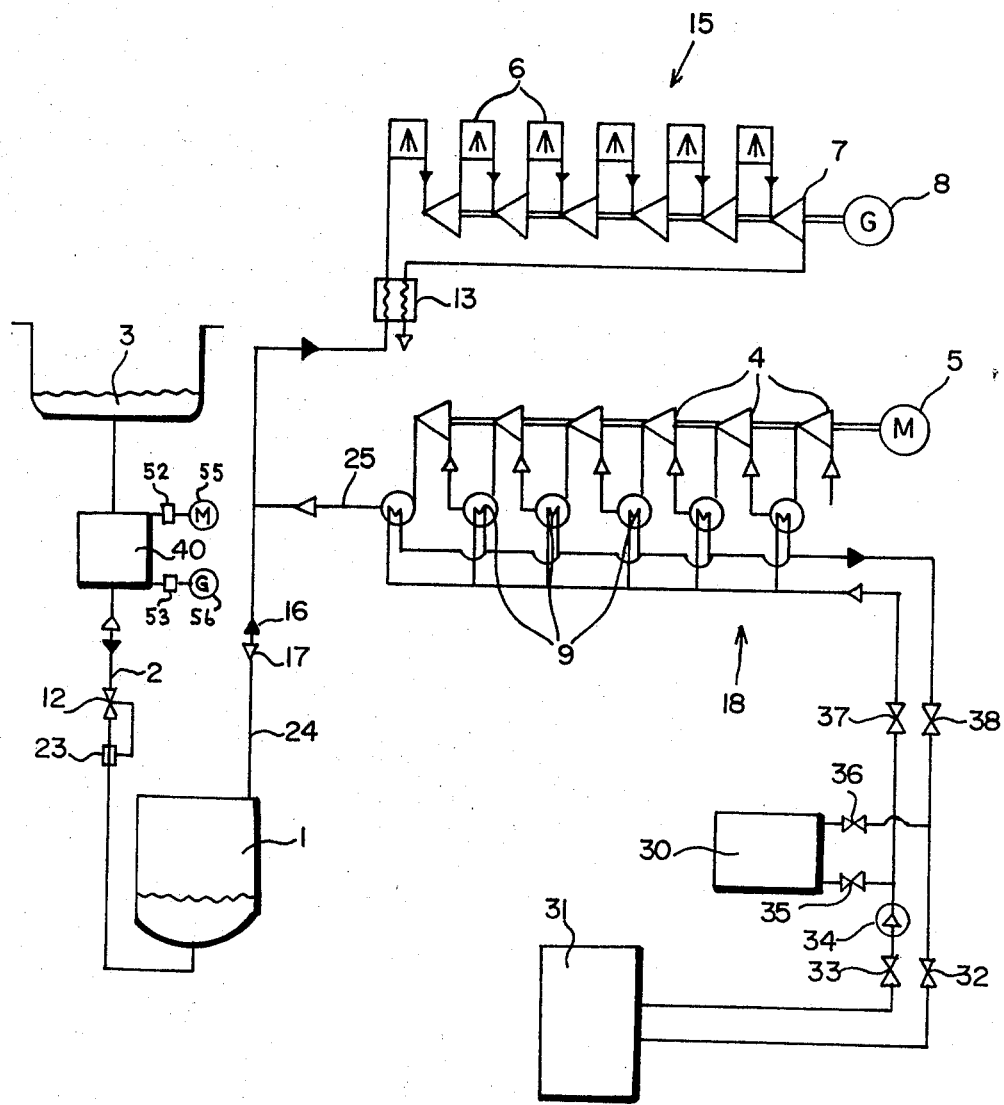

United States Patent [19]
Margen

[11] 3,869,857
[45] Mar. 11, 1975

[54] THERMAL POWER PLANT

[75] Inventor: Peter Heinrich Erwin Margen, Nykoping, Sweden

[73] Assignee: Aktiebolaget Atomenergi, Stockholm, Sweden

[22] Filed: Feb. 1, 1973

[21] Appl. No.: 328,688

[52] U.S. Cl. ......... 60/39.18 R, 60/39.02, 60/39.07, 290/52, 61/0.5
[51] Int. Cl. ........................................... F02b 21/00
[58] Field of Search ..... 60/39.18 R, 39.18 A, 39.07, 60/39.75, 39.02; 290/52, 2, 1; 61/0.5

[56] References Cited
UNITED STATES PATENTS

| | | | |
|---|---|---|---|
| 2,246,472 | 6/1941 | Sharp | 290/52 |
| 2,433,896 | 1/1948 | Gaya | 290/52 |
| 2,683,224 | 7/1954 | Cole | 290/52 |
| 2,942,424 | 6/1960 | Koble | 61/0.5 |
| 3,368,082 | 2/1968 | Oberlander | 290/52 |
| 3,405,278 | 10/1968 | Ley | 290/52 |
| 3,523,192 | 8/1970 | Lang | 290/52 |
| 3,538,340 | 11/1970 | Lang | 290/52 |
| 3,643,426 | 2/1972 | Janelid | 60/39.02 |

FOREIGN PATENTS OR APPLICATIONS

| | | | |
|---|---|---|---|
| 901,719 | 7/1949 | Germany | 60/39.07 |
| 1,209,936 | 9/1959 | France | 60/39.07 |

*Primary Examiner*—William L. Freeh
*Assistant Examiner*—Warren Olsen
*Attorney, Agent, or Firm*—Toren, McGeady and Stanger

[57] ABSTRACT

There is provided a thermal power plant in which an air compressor is charging a rock chamber with compressed air. The rock chamber is communicating via a conduit with a water reservoir being located at a higher level than the rock chamber. A water pump being installed in the conduit is improving the counter action of the water column on the air pressure, and thus the air storage capacity of the rock chamber. The compressed air is fed to a gas turbine when additional power is needed.

10 Claims, 2 Drawing Figures

THERMAL POWER PLANT

The invention relates to a thermal power plant, more specifically to a thermal power plant of the type comprising a gas turbine, an electric generator driven by the gas turbine, a compressor to generate compressed air, a compressed air magazine to receive compressed air from the compressor and deliver the compressed air to the gas turbine, a water reservoir located at a higher level than the compressed air magazine, and a water conduit between the water reservoir and the compressed air magazine through which water is led from the water container to the compressed air magazine while this is being discharged and in the opposite direction while the compressed air magazine is being charged. The compressor to generate the compressed air may be driven by the gas turbine but alternatively it may be driven by a separate motor. The latter is advisable if the thermal power plant is intended to be in operation only during periods of peak load, in which case the compressor can be driven continuously, or only during periods of low load.

It is known that in a thermal power plant of the type described, the compressed air magazine may comprise a rock chamber which is located at such a great depth that the static pressure obtained due to the level difference between the water container and the rock chamber corresponds to the required air pressure. However, such a rock chamber is normally extremely expensive since it must be located at such a great depth.

The invention aims at providing a thermal power plant where the compressed air magazine is located only at a reasonable depth below the water reservoir but contains compressed air having a pressure which is at least twice as high, preferably several times higher than the static pressure corresponding to the difference in level between the compressed air magazine and the water reservoir. The invention particularly relates to a thermal power plant in which the compressed air container has only been blasted at such a depth that the rock above is sufficiently strong to withstand the high air pressure. For example, for an air pressure of 80 atmospheres it is sufficient if the highest point of the rock chamber is located at a depth of 100 m, as against 800 m for a conventionally located rock chamber.

According to the invention, this increased pressure in the rock chamber can be achieved by arranging a pump in the water conduit connecting the water reservoir to the rock chamber. When the compressed air magazine is being discharged, the pump maintains the pressure in the chamber at a considerably higher level than the static pressure which can be obtained due to the level difference between the water reservoir and the compressed air magazine.

When the compressed air magazine is being discharged, therefore, energy must be sacrificed in order to pump water into the compressed air magazine. However, it has been found that this energy loss is more than compensated by the advantage gained by being able to locate the rock chamber higher up, or that a rock chamber of a certain size and at a certain depth can hold a considerably larger mass of air than if only the natural difference is level between the water reservoir and the rock chamber had been utilized. The loss in energy due to the operation of the pump can be partially recovered by permitting the water which, when the compressed air magazine is being charged, flows to the water reservoir under pressure drop to drive a turbine which in turn drives an electric generator, for example. Alternatively the water turbine may be connected to the shaft of the compressor so that it provides some of the power necessary to operate the compressor. The pump and the water turbine may be placed in separate branches of the water conduit. Another alternative is for the pump to be arranged so that it can be driven as a water turbine. In this case the water conduit need only include a reversible turbine-pump unit. By means of a first coupling this turbine-pump unit can be connected to an electric motor and by means of a second coupling it can be connected to an electric generator. As already mentioned the pump may be run by an electric motor. Alternatively the pump may be arranged on the same shaft as the gas turbine and thus be driven by this.

Figure 2:
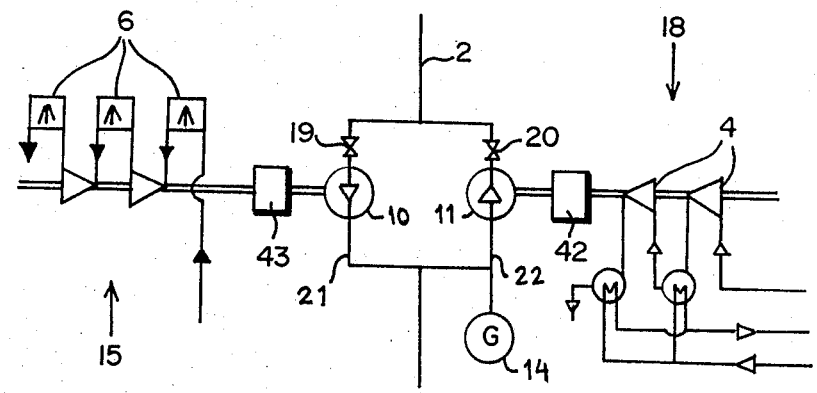

In the following the invention will be explained more fully with reference to the accompanying drawing in which, in simplified form, FIG. 1 shows a thermal power plant according to the invention, and FIG. 2 show an alternative embodiment of the plant according to the invention.

In order to facilitate an understanding of the drawing the flow directions in the conduits have been indicated by arrows of two different types. Arrows of type 16 show the flow during periods of peak load and arrows of type 17 show the flow during other periods. The thermal power plant comprises a gas turbine 15 consisting of a plurality of turbine steps 7 connected to a common shaft, each turbine step having its own cumbustion chamber 6. The compressed air flowing in is led in turn through the various turbine steps, thus exploiting the high pressure of the compressed air to the full. The exhaust from the last step of the gas turbine is led through a regenerative heat exchanger 13 where it can heat incoming compressed air. Due to the high pressure of the compressed air, this pre-heating results in a considerable increase in the efficiency for a limited extra initial outlay in cost. The gas turbine 15 is arranged to drive an electric generator 8.

The compressed air is generated in a compressor 18 comprising a plurality of compressor steps 4 driven by a common motor 5. Between the various steps and after the final step coolers 9 are arranged.

A compressed air magazine 1, preferably a rock chamber, is arranged for the storage of the compressed air. A conduit 2 extends from the bottom of the compressed air magazine up to a water reservoir 3, preferably a lake. The conduit 2 is divided into two branches 21, 22 (FIG. 2). The branch 21 contains a valve 19 and a pump 10, which is driven by a motor (not shown). The branch 22 contains a water turbine 11 arranged to drive an electric generator 14. The water turbine 11 is connected to the shaft of the compressor 18 by means of a coupling 42 and the pump 10 is connected to the shaft of the gas turbine 15 by means of a coupling 43.

The conduit 2 also includes a flow gauge 23 and a valve 12 actuated by this gauge. if, due to the pipe rupture, the flow rate of the water in the conduit 2 exceeds the maximum permitted rate, the valve 12 will close.

Alternatively, the pump and the water turbine may be replaced by a reversible turbine-pump unit 40. By means of a first coupling 52 this turbine-pump unit 40 can be connected to an electric motor 55 and by means of a second coupling 53 it can be connected to an electric generator 56.

The compressed air magazine 1 is in communication with the preheater 13 and the gas turbine 15 through a conduit 24. The high pressure side of the compressor 18 is in communication with the conduit 24 through a conduit 25.

The thermal power plant illustrated operates in the following manner: At a time when there is maximum demand for electricity, the compressor 18 is turned off and the gas turbine 15 started, whereupon compressed air is taken from the magazine 1. A substantially constant air pressure is maintained in this magazine by water being supplied from the water reservoir 3 through the pump 10 and conduit 2.

When the peak load period is over the gas turbine 15 is turned off and the compressor 18 started, whereupon the compressed air generated is led to the compressed air magazine 1 which is thus charged. The water forced out of the compressed air magazine is led to the water reservoir 3 through the conduit 2 and the water turbine 11, in which the drop in pressure of the water is exploited to generate electric energy in the generator 14.

Instead of the internal combustion in the combustion chambers 6, the compressed air may be heated in heat chambers which are heated externally, for example by means of oil or by a hot heat medium which has been heated in a nuclear reactor in which it acts as coolant.

The heat obtained from the coolers 9 can be utilized in various ways. For example it may be used in a district heating plant for residential heating or in an evaporation plant for converting salt water to fresh water. In order to be able to provide the heat consumer 31 with a continuous supply of heat, some of the heat from the coolers 9 is preferably permitted to heat the water in a hot water accumulator 30 from which heat can be taken while the compressor 18 is out of operation. The flow of water from the compressor 18 to the accumulator 30 and the heat consumer 31, respectively, is controlled by valves 32, 33, 35–38 and a pump 34, According to an alternative embodiment the generator 8 and the motor 5 may comprise a motor-generator unit which can be run alternately as generator and motor. This unit is then connected to the gas turbine 15 and the compressor 18 by means of couplings so that it can be connected to one or other of these machines as desired.

What is claimed is:

1. A thermal power plant comprising a gas turbine, an electric generator driven by said gas turbine, a compressor arranged to generate compressed air, a compressed air magazine arranged to receive compressed air from said compressor and to deliver the compressed air to said gas turbine, a water reservoir having its lower end located at a considerably higher level than the upper end of said compressed air magazine, and a water conduit extending between said water reservoir and said compressed air magazine in direct contact with the water in said reservoir and providing a passage through which the water is led from said water reservoir to said compressed air magazine while said magazine is being discharged and is led to the opposite direction while said magazine is being charged, wherein the improvement comprises that said compressed air magazine comprises an enclosed below-ground level rock chamber arranged for the storage of compressed air at a pressure at least twice as high as the static pressure corresponding to the difference in level between the rock chamber and the water reservoir, said water conduit forming a closed passage extending downwardly from its upper end connected to said reservoir below the water level therein to its lower end connected to the lower end of said compressed air magazine, means for pressurizing the water in said water conduit to a pressure at least twice that of the static pressure head acting on said compressed air magazine through the water in said conduit due to the difference in level between the water level in said reservoir and the bottom of said compressed air magazine, said means comprises a pump located in said water conduit intermediate the ends thereof below said water reservoir and above said compressed air magazine for pressurizing the water in said conduit communicating with said compressed air magazine.

2. Thermal power plant according to claim 1, characterized in that the water conduit (2) includes a shut-off valve (12) and a flow gauge (23) which actuates the shut-off valve, said flow gauge being arranged to close the shut-off valve (12) when the flow rate in the water conduit reaches a maximum permitted value.

3. Thermal power plant according to claim 1, characterized in that the compressor (18) comprises a plurality of compression steps (4) and a cooler (9) positioned after each compression step.

4. Thermal power plant according to claim 1, characterized in that the pump (10) is connected to the shaft of the gas turbine (15).

5. Thermal power plant according to claim 1, characterized in that a water turbine is located in said water conduit and said water turbine is arranged to be driven by the water which flows under pressure through said conduit from said compressed air magazine to said water reservoir when said compressed air magazine is being charged.

6. Thermal power plant according to claim 5, characterized in that the water turbine (11) is connected to the shaft of the compressor (18).

7. Thermal power plant according to claim 5, characterized in that the pump (10) and the water turbine (11) consist of a reversible pump-turbine unit (40).

8. Thermal power plant according to claim 1, characterized in that said gas turbine comprises several turbine steps, and a heat source provided for each said turbine step.

9. Thermal power plant according to claim 3, characterized in that a heat consumer is connected to said coolers.

10. Thermal power plant according to claim 9, characterized in that a heat accumulator is connected to said coolers and the path flow therefrom to said heat consumer for permitting a continuous supply of the heat to said heat consumer.

* * * * *